United States Patent
Groenewold et al.

(10) Patent No.: US 10,181,875 B2
(45) Date of Patent: Jan. 15, 2019

(54) SAFETY LINK FOR SHIP TO SHORE-, SHORE TO SHIP- AND/OR SHIP TO SHIP-COMMUNICATIONS

(71) Applicant: European Intelligence B.V., Dordrecht (NL)

(72) Inventors: Steven Anthonius Groenewold, Papendrecht (NL); Gerardus Antonius Jozef Mampaeij, Dordrecht (NL)

(73) Assignee: EUROPEAN INTELLIGENCE B.V., Dordrecht (NL)

( * ) Notice: Subject to any disclaimer, the term of this patent is extended or adjusted under 35 U.S.C. 154(b) by 0 days.

(21) Appl. No.: 15/261,504

(22) Filed: Sep. 9, 2016

(65) Prior Publication Data
US 2017/0077992 A1 Mar. 16, 2017

(30) Foreign Application Priority Data
Sep. 10, 2015 (NL) ...................................... 2015422

(51) Int. Cl.
*B67D 9/00* (2010.01)
*H04B 3/60* (2006.01)
*G08C 19/00* (2006.01)

(52) U.S. Cl.
CPC .............. *H04B 3/60* (2013.01); *G08C 19/00* (2013.01); *B63B 2203/00* (2013.01); *B67D 9/00* (2013.01)

(58) Field of Classification Search
CPC .............. H04B 3/60; H04B 3/61; H04B 3/00
USPC ....................................................... 340/852
See application file for complete search history.

(56) References Cited

U.S. PATENT DOCUMENTS

| | | | | |
|---|---|---|---|---|
| 3,047,016 A * | 7/1962 | Andresen | ................. | B67D 9/02 137/615 |
| 6,390,733 B1 * | 5/2002 | Burbage | ................. | B63B 25/12 114/121 |
| 2005/0039800 A1 * | 2/2005 | Lothe | ..................... | B63B 27/24 137/592 |
| 2010/0263389 A1 * | 10/2010 | Bryngelson | ............. | F17C 13/02 62/50.2 |
| 2016/0146385 A1 * | 5/2016 | Bryngelson | ............. | F17C 13/02 285/1 |

FOREIGN PATENT DOCUMENTS

| KR | 10-2004-0027791 | 4/2004 |
|---|---|---|
| WO | 2008/047982 | 4/2008 |
| WO | 2010/120908 | 10/2010 |
| WO | 2011/146763 | 11/2011 |

* cited by examiner

*Primary Examiner* — Qutbuddin Ghulamali
(74) *Attorney, Agent, or Firm* — Peacock Law P.C.; Janeen Vilven; Camille Martinez

(57) ABSTRACT

Control module(s) and safety link(s) for ship communications arranging for emergency shutdown ESD communication between an unloading storage facility for hazardous goods on either ship or shore and a loading storage facility for hazardous goods on either ship or shore, with at least one umbilical line, connectors for coupling the control module (s) with the lines, the lines using bidirectional communication between a ship type control module and a shore type control module, and a transfer switch to switch the communication mode of the concerning control module between ship type and shore type.

7 Claims, 6 Drawing Sheets

SAFETY LINK FOR SHIP TO SHORE-, SHORE TO SHIP- AND/OR SHIP TO SHIP-COMMUNICATIONS

CROSS-REFERENCE TO RELATED APPLICATIONS

This application claims priority to and the benefit of the filing of Netherlands Patent Application No. 2015422, filed on Sep. 10, 2015, and the specification and claims thereof are incorporated herein by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION BY REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

COPYRIGHTED MATERIAL

Not Applicable.

BACKGROUND OF THE INVENTION

Field of the Invention (Technical Field)

The present invention relates to a safety link for ship to shore-, shore to ship- and/or ship to ship-communications comprising a control module or control modules to arrange for emergency shutdown communication between an unloading storage facility for hazardous goods on either ship or shore and a loading storage facility for hazardous goods on either ship or shore. The invention also relates to the control module or control modules used in such a safety link.

Description of Related Art Including Information Disclosed Under 37 C.F.R. §§ 1.97 and 1.98

Safety links are known from www.vantagexp.com/industries/lng.html. This reads in pertinent part: "The Ship/Shore Link Control Module, for Emergency Shut Down (ESD) & Communication System are used in LNG terminals as either a main system or a back-up system. The system handles: 4 telephone channels Shore/Ship ESD volt-free contact signals Additional shore-ship ESD signals as required by certain US import terminals The Electric Ship/Shore Link System is designed for Emergency Shut Down and Communications. Vantage AF Series 37 pin connectors are used in this system. To ensure safe functioning during emergency breakaway all ESD circuits are protected by intrinsically safe techniques. The telephone circuits, which must not pass thru barriers, are powered from shore and isolated by shore relays which are switched by continuity loops from the shipboard module. The Vantage electric system can be supplied as a stand-alone, but can be installed in the same cabinet as the Fiber Optic Communications and ESD system."

A similar system is known from www.trelleborg.com/en/marine-systems/Products--Solutions--and--Services/Oil--and--Gas--Transfer/Emergency--Shutdown--Link/Emergency--Shutdown--Link. This reads in pertinent part that: "The transfer of hazardous liquids between ship and shore necessitates the use of Emergency Shutdown Link (ESL) systems. Trelleborg Marine Systems has developed its ESL for LPG, ethane, oil and chemical gas transfer operations, offering a reliable link enabling rapid and controlled shutdown in emergency situations. The ESL comprises shoreside and ship-side sub-systems. These both possess a 'safe area' control unit, linked by fixed cable to hazardous area closures/control boxes. The hazardous area enclosures are then connected together by a flexible umbilical cable that allows the two sub-systems to communicate. The safe area control units are also connected into the ship/shore Emergency Shut Down (ESD) systems to ensure the correct and safe shut down of equipment in the event of an emergency. The ESL has an option allowing use in cases where only one side of the transfer operation is equipped with the Trelleborg's SeaTechnik™ ESL system."

Accordingly, the prior art teaches a control module and a safety link for ship to shore-, shore to ship- and/or ship to ship-communications comprising such a control module or control modules to arrange for emergency shutdown ESD communication between an unloading storage facility for hazardous goods on either ship or shore and a loading storage facility for hazardous goods on either ship or shore. The known safety link comprises at least one of pneumatic-, electrical-, and/or fiber-optic-umbilical lines, wherein the control module is, or the control modules are provided with connectors for coupling the control module or control modules with said pneumatic-, electrical-, and/or fiber-optic-umbilical lines, and preferably voice communication lines, wherein the said control modules to which said umbilical lines are coupled are designed for bidirectional communication on each umbilical line between a ship type control module and a shore type control module.

In the context of the invention any reference to an electrical umbilical line covers both a vantage electrical link; a Miyaki-Denki electrical link; and a SIGTTO electrical link. These types of links are known to the skilled person and require no further elucidation.

In the prior art it is common use that a dedicated ship type control module and a dedicated shore type control module and the mentioned umbilical lines between the two types of control modules are set up separately for each individual case that a hazardous good must be transferred from ship to shore, from shore to ship, or from ship to ship. It can for instance happen that a ship will at one time be delivering hazardous goods and another time will be receiving hazardous goods. For this purpose each day engineers are flying all over the globe to locations where hazardous goods are to be transferred between a mobile storage facility (a ship) and a mobile or fixed storage facility (another ship or a facility on shore) to set up the required safety links between the two storage facilities. This is costly and requires a lot of manpower.

BRIEF SUMMARY OF THE INVENTION

It is an object of the invention to simplify the known safety link and to provide a control module by which a more cost-effective and flexible ship to shore-, shore to shipand/or ship to ship-communication is possible, which can arrange for the required emergency shutdown communication when hazardous goods are to be transferred from one storage facility to another.

According to the invention the safety link and the control module or the control modules that may form part thereof are equipped with a transfer switch to switch the communication mode of the concerning control module from acting as a ship type control module to acting as a shore type control module or vice versa. This makes it possible to standardize the control modules to be used on both the ship side as on the shore side or other shipside for providing the required emergency shutdown communication to secure the safe transfer of hazardous goods. Accordingly huge cost savings are possible since the control modules need not be tailored anymore beforehand to the specific function (ship type or shore type) for which they are intended.

The benefits of the invention are particularly achieved by arranging the control module or control modules of the invention such that activating the transfer switch for switching from a ship type control module to a shore type control module induces that the concerning control module or control modules execute the following transfers:

for electrical umbilical lines, automatically rewire predefined pins of the connectors from ship type to shore type; and for fiber-optic umbilical lines, automatically set the communication frequencies for sending and receiving at applicable high band frequencies (receiving ship to shore communication) and low band frequencies (sending shore to ship communication); and by activating the transfer switch for switching from a shore type control module to a ship type control module, the control module or control modules are arranged to automatically revert to the settings corresponding to those of a ship type control module.

The term 'automatically' as used herein means <without human intervention> except for the activation of the transfer switch. All ensuing actions of the control module caused by the activation of the transfer switch are done automatically.

The term 'high band frequencies' as used herein are for instance frequencies in the range between 70 and 120 kHz, whereas the term low band frequencies' as used herein are for instance frequencies in the range between 10 and 60 kHz.

There are more benefits achieved with the safety link of the invention, which particularly relate to an embodiment of the safety link in which on a ship side and/or on a shore side of the safety link at least two control modules are installed. This makes possible that the two control modules that are located on the same side (ship or shore) are both switchable to the same mode, i.e., either ship type mode or shore type mode. This provides a backup facility wherein a seamless transfer between the two control modules is possible when the backup control module has to take over the function of the other control module when this latter control module fails. In this way the security of the emergency shutdown communication is not compromised during the transfer from one control module to the other. This means that the transfer of hazardous goods can continue despite the failing of one of the control modules, and that tremendous cost savings are attainable since in conventional systems the failing of a control module leads unavoidably to the shutdown of the transfer of hazardous goods and necessitates an extended stay of the concerning ship trying to deliver its goods. As everyone in the trade knows the costs of such an extended stay are very high.

Another notable benefit of the safety link having two control modules according to the invention is that the two control modules that are located on the same side (ship or shore) are switchable to opposite modes, i.e., ship type mode and shore type mode. This makes possible to locally execute a full operational check of the concerning control module and its connected umbilical lines and avoids the cumbersome extensive checking procedures that are required in the prior art.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

It is known from the prior art and therefore not further shown or discussed with reference to the figures that a safety link for ship to shore-, shore to ship- and/or ship to ship-communications comprises a control module or control modules that arranges for emergency shutdown ESD communication between an unloading storage facility for hazardous goods on either ship or shore, and a loading storage facility for hazardous goods on either ship or shore. The instant invention and the improvements according to the invention particularly relate to the said control module or control modules as shown and discussed hereinafter with reference to the figures appended to this description.

Consistent with the prior art and therefore also not shown in the figures is that the control module or the control modules of the invention comprise in a known way connectors for coupling the control module(s) to at least one of pneumatic-, electrical-, and/or fiber-optic-umbilical lines, wherein said control modules are designed for bidirectional communication on each umbilical line between a ship type control module and a shore type control module. The complicated and expensive operations of the prior art are to a large extent simplified and made cheaper in the invention in which the control module is, or the control modules are equipped with a transfer switch to switch the communication mode of the concerning control module from acting as a ship type control module to acting as a shore type control module or vice versa. This makes possible that both on ships and on shore the same control modules can be installed and that depending on the requirements the control modules are switched to the appropriate communication mode, that is to say to ship type mode or to shore type mode of operation. The transfer switch can be activated in an appropriate menu provided on an interface 5 of a control module of the invention, which is preferably computer-driven.

Figure 1:
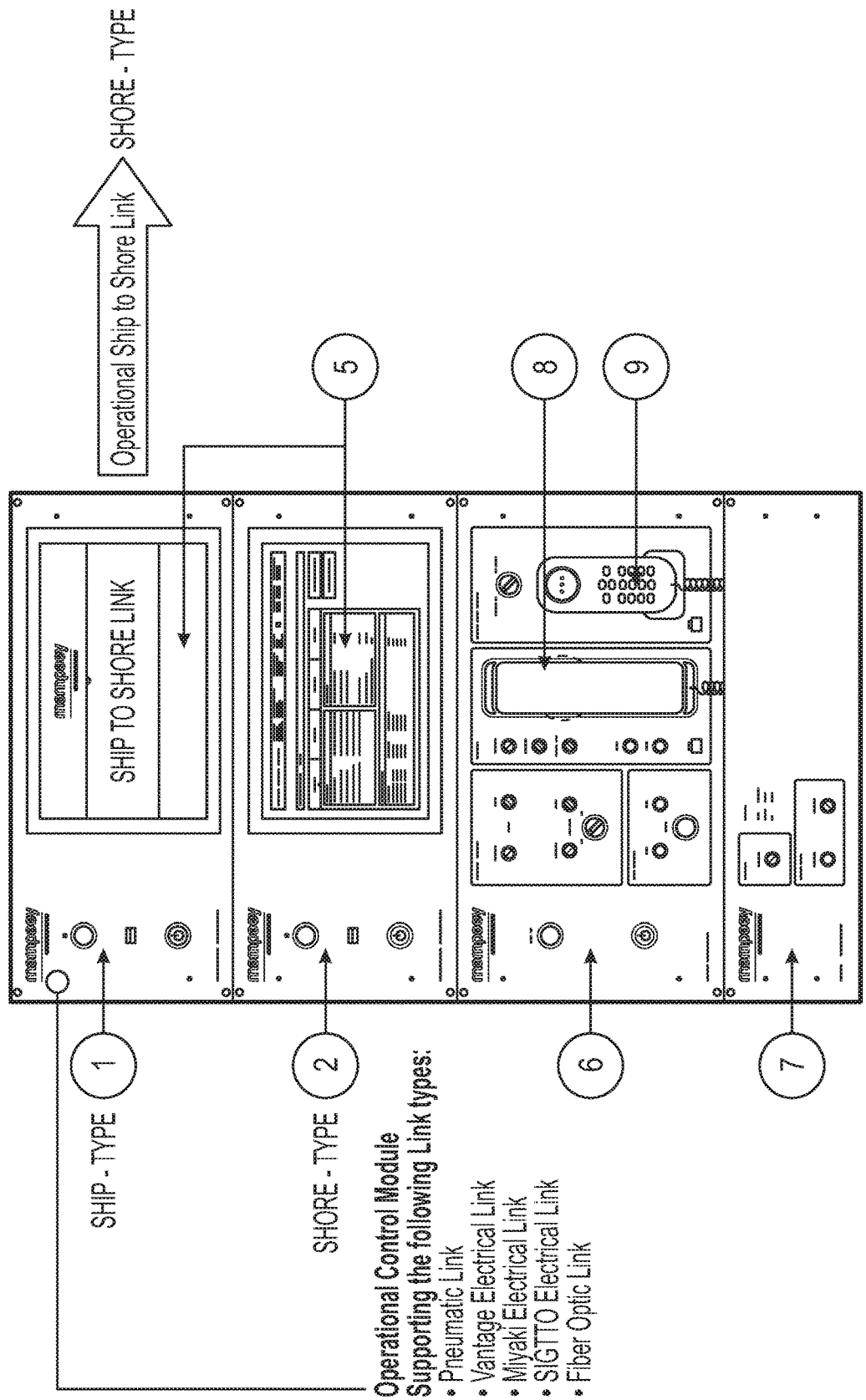
FIGS. 1 and 2 show a ship type and shore type control module respectively of a safety link according to the invention in operational mode.
Figure 2:
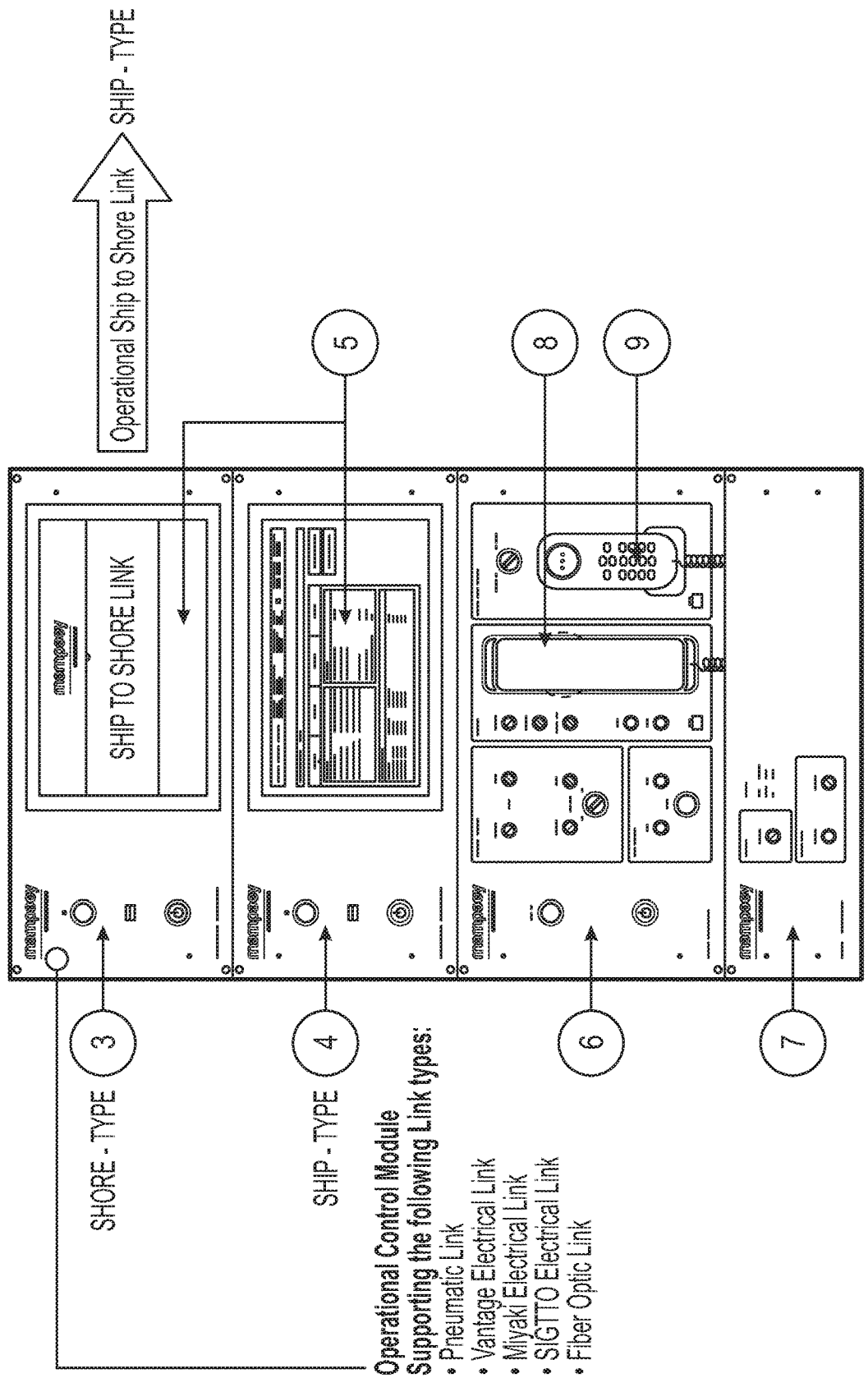

In FIGS. 1 and 2 a normal operational mode of the control modules of the invention is shown with a control module in ship type mode and a control module in shore type mode that cooperate with each other. For reasons to be explained hereinafter FIG. 1 shows two control modules 1, 2 that are located on a ship, wherein only a main control module 1 is active and the other control module 2 is idle. Also FIG. 2 shows two control modules 3, 4 that are in this case located on shore and that are intended to cooperate with the control module(s) 1, 2 shown in FIG. 1, and wherein only a main control module 3 is active and the other control module 4 is idle. The functionality and usefulness of the idle control modules 2 and 4 will be explained hereinafter with reference to FIGS. 3-6. For the normal operational mode of the safety link as discussed with reference to FIGS. 1 and 2 the idle control modules 2, 4 could therefore also be dispensed with as being redundant.

To provide the required functionality of an emergency shutdown communication link the main control module 1 of FIG. 1 provides a communication facility with the main control module 3 of FIG. 2, wherein the control module 1 of FIG. 1 is switched in ship type mode and control module 3 of FIG. 2 is switched in shore type mode. Control module 1 which is in the ship type mode is then equipped to send a 'ship to shore'-signal to control module 3 which is equipped to receive such 'ship to shore'-signal by being placed in the shore type mode, and simultaneously control module 3 is likewise equipped to send a 'shore to ship'-signal to control module 1 which is equipped to receive such 'shore to ship'-signal by being placed in the ship type mode.

Primarily the invention provides an easy adjustment facility to meet the needs and requirements of the safety link to be used. It can for instance happen that a ship will at one time be delivering hazardous goods and another time will be receiving hazardous goods. Depending on the situation the control module to be used on the ship must then be of the 'ship type' when delivering hazardous goods, and must be of the 'shore type' when receiving hazardous goods. The invention makes possible to use the same control module and use its transfer switch to switch the control module simply to either 'ship type mode' or to 'shore type mode'. Accordingly by activating the transfer switch for instance for switching from a ship type mode control module to a shore type mode control module, the concerning control module is arranged to execute the following transfers:

for electrical umbilical lines, automatically re-wire pre-defined pins of the connectors from ship type to shore type;

for fiber-optic umbilical lines, automatically set the communication frequencies for sending and receiving at applicable high band (receiving ship to shore communication) and low band (sending shore to ship communication) frequencies. Correspondingly when the transfer switch is activated for switching from a shore type mode control module to a ship type mode control module, the control module therewith automatically reverts to the settings corresponding to those of a ship type control module. Installation of the safety link of the invention is therefore very much simplified and it is no longer required to provide dedicated control modules on ship and on shore as is required in the prior art, since the same design control modules can be used in the safety link of the invention and tailored for the required purposes.

Figure 3:
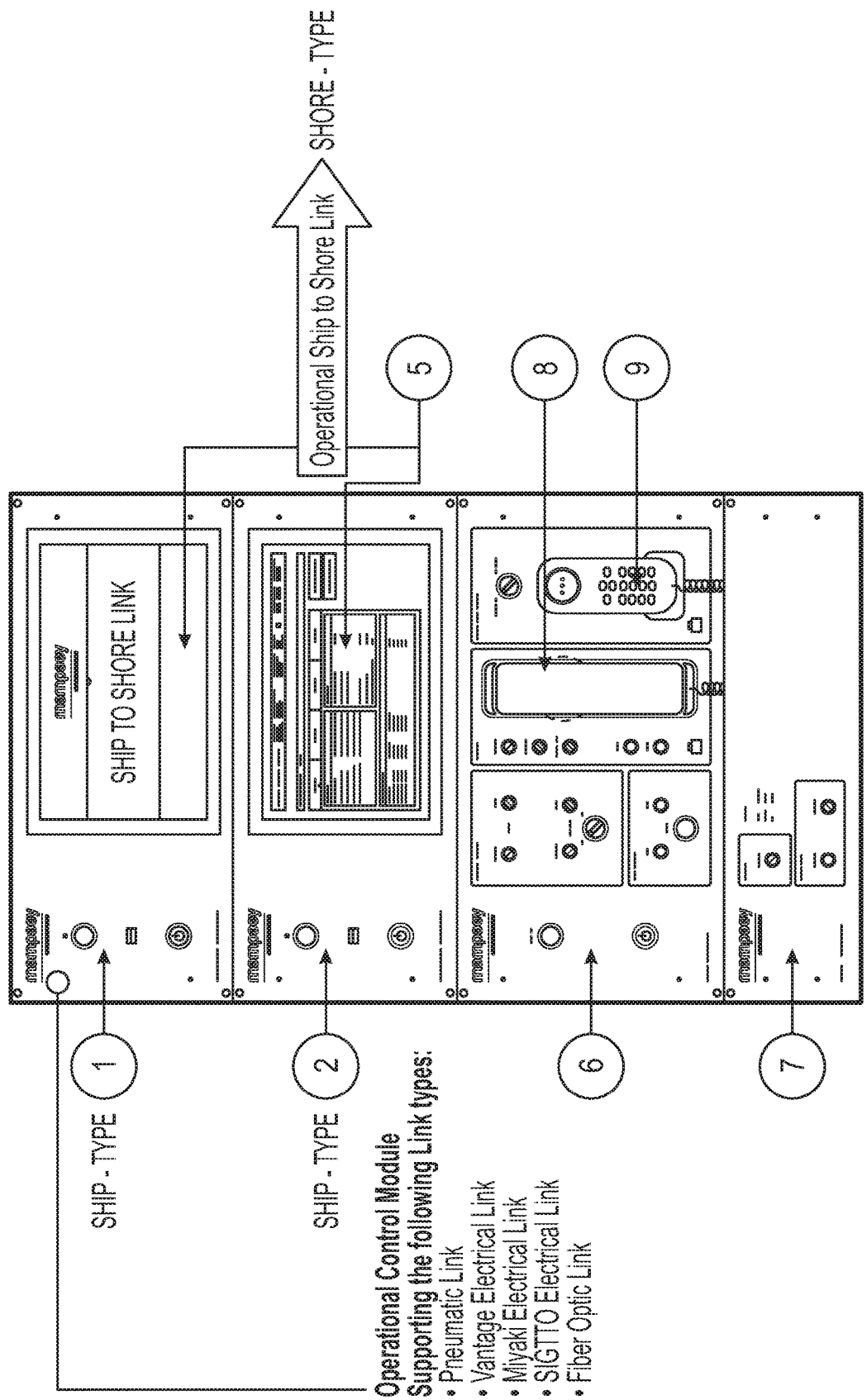
FIGS. 3 and 4 show a ship type and shore type control module respectively of a safety link according to the invention in operational backup mode.
Figure 4:
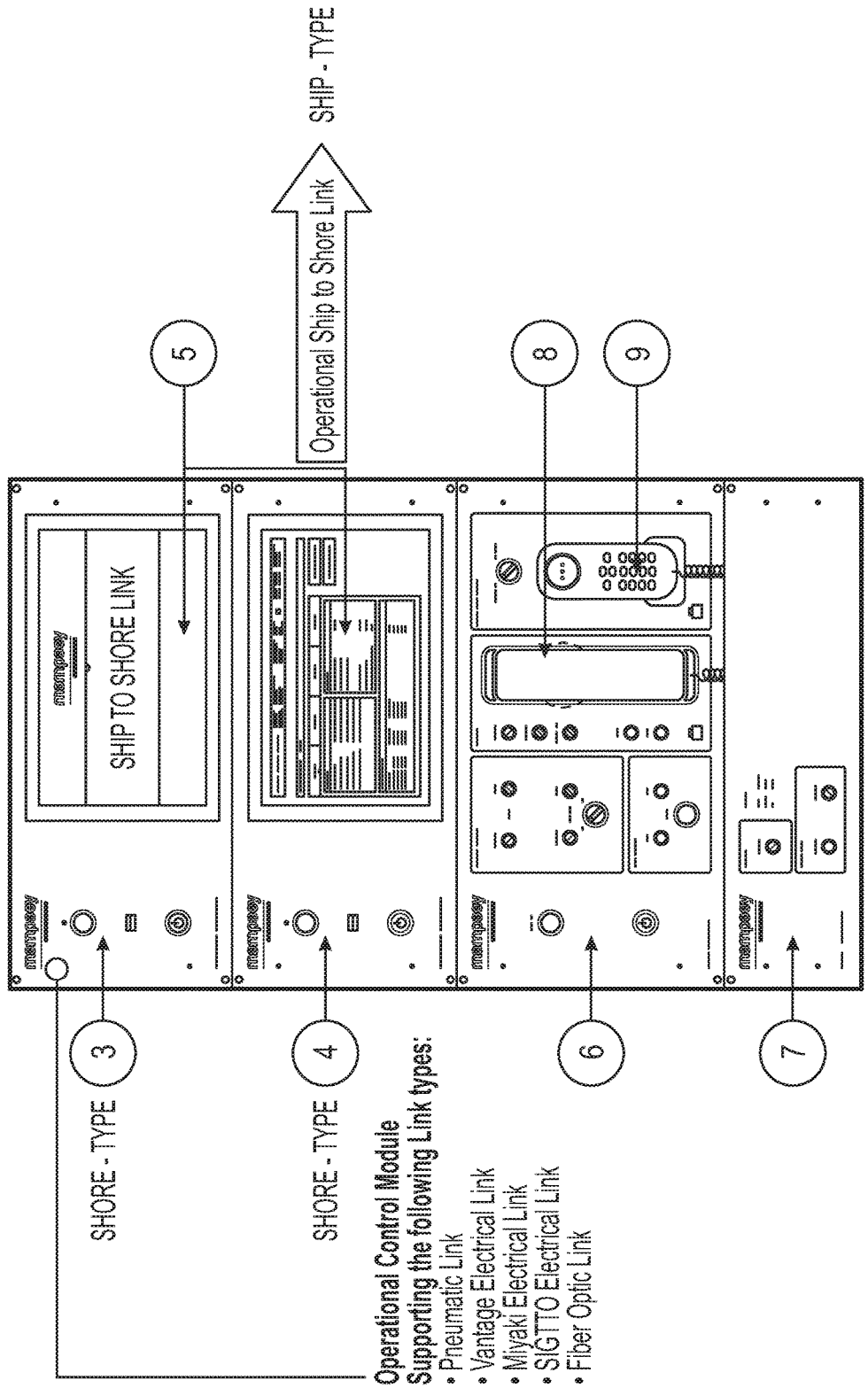

As already mentioned above with reference to FIGS. 1 and 2, another feature of the invention is that on a ship side and/or on a shore side of the safety link two control modules, that is main control modules 1, 3 and idle control modules 2, 4 are installed. This provides several advantages. In one embodiment when two adjoining control modules are applied as shown in FIGS. 3 and 4, the two control modules 1, 2 and 3, 4 that are located on the same side (control modules 1, 2 on a ship, and control modules 3, 4 on shore) can be both switched to the same mode, i.e., ship type mode in FIG. 3 and shore type mode in FIG. 4. The control modules 2 and 4 then provide a backup facility for their respective counterpart control modules 1 and 3, thus making a transfer possible between the dual control modules 1, 2 on the ship side and the dual control modules 3, 4 on shore side when a concerning backup control module 2 or 4 has to take over the function of the main control module 1 or 3 when the latter control module fails.

Figure 5:
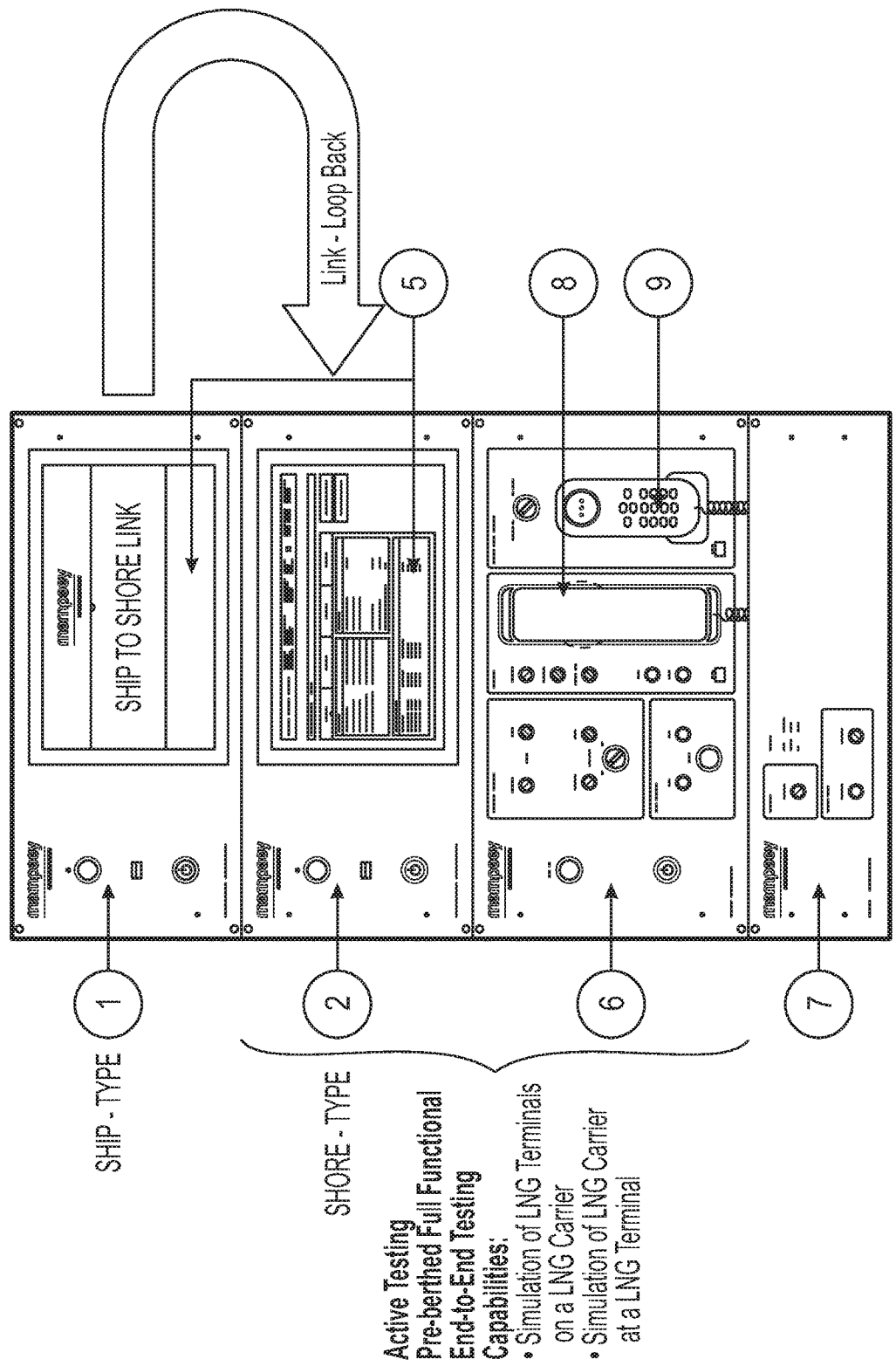
FIGS. 5 and 6 show a ship type and shore type control module respectively of a safety link according to the invention in testing mode.
Figure 6:
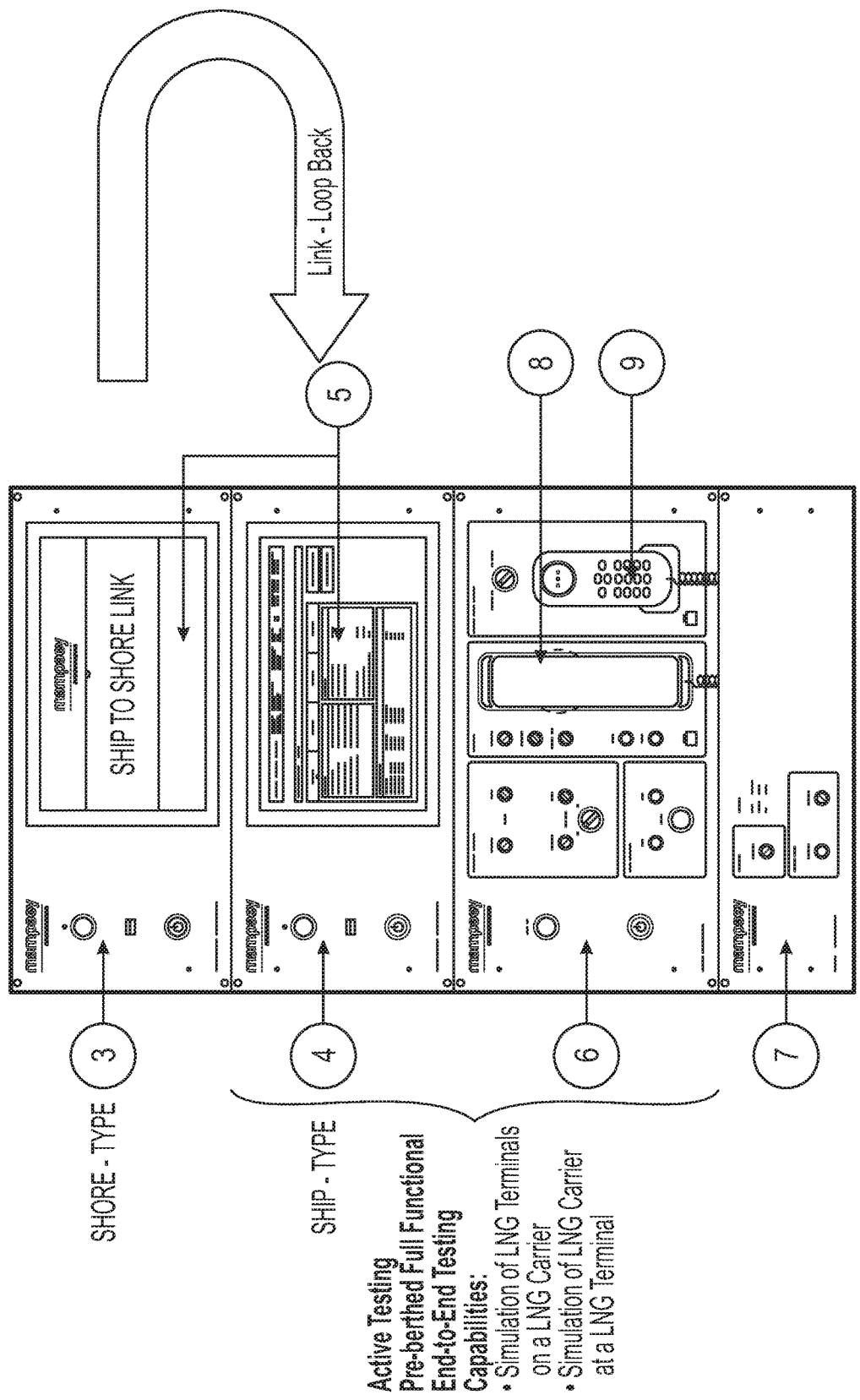

In another embodiment as shown in FIGS. 5 and 6, the two control modules 1, 2 and 3, 4 that are located on the same side (control modules 1 and 2 on a ship, and control modules 3 and 4 on shore) can be switched to opposite modes, i.e., to ship type mode for sending and shore type mode for receiving in FIG. 5, and to shore type mode for sending and ship type mode for receiving in FIG. 6. This makes possible to locally execute a full operational check of the concerning control modules 1, 2 and their connected umbilical lines on the ship side (as shown in FIG. 5), as well as to locally execute a full operational check of the concerning control modules 3, 4 and their connected umbilical lines on the shore side (as shown in FIG. 6).

Finally it is remarked that the FIGS. 1-6 further show a test module 6 and a power module 7, that are not essential to the invention but which are shown for sake of completeness. The test module 6 is amongst others provided with a hot phone 8 and a normal phone 9. Power module 7 provides power to the control modules and the test module 6.

Although the invention has been described in detail with particular reference to these embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A safety link for ship to shore-, shore to ship- and/or ship to ship-communications comprising a control module or control modules to arrange for emergency shutdown ESD communication between an unloading storage facility for hazardous goods on either ship or shore and a loading storage facility for hazardous goods on either ship or shore, and comprising at least one of pneumatic-, electrical-, and/or fiber-optic-umbilical lines, wherein the control module is, or the control modules are provided with connectors for coupling the control module or control modules with said pneumatic-, electrical-, and/or fiber-optic-umbilical lines, wherein said control modules to which said umbilical lines are coupled are designed for bidirectional communication on each umbilical line between a ship type control module and a shore type control module, wherein the control module is or the control modules are equipped with a transfer switch configured to automatically switch the communication mode of the concerning control module between acting as a ship type control module and acting as a shore type control module.

2. The safety link according to claim 1, wherein by activating the transfer switch for switching from a ship type control module to a shore type control module, the concerning control module or control modules are arranged to automatically execute the following transfers:

for electrical umbilical lines, rewire predefined pins of the connectors from ship type to shore type; and for fiber-optic umbilical lines, set the communication frequencies for sending and receiving at applicable high band (receiving ship to shore communication) and low band (sending shore to ship communication) frequencies; and by activating the transfer switch for switching from a shore type control module to a ship type control module, the control module or control modules are arranged to automatically revert to the settings corresponding to those of a ship type control module.

3. The safety link according to claim 1, wherein on a ship side and/or on a shore side of the safety link two control modules are installed.

4. The safety link according to claim 3, wherein the two control modules that are located on the same side (ship or shore) are both switchable to the same mode, i.e., either ship type mode or shore type mode.

5. The safety link according to claim 3, wherein the two control modules that are located on the same side (ship or shore) are switchable to opposite modes, i.e., ship type mode and shore type mode.

6. A control module for emergency shutdown ESD communication comprising at least one connector for coupling with pneumatic-, electrical-, and/or fiber-optic-umbilical lines that are coupled or to be coupled to another control module, and designed for bidirectional communication via each said umbilical line connected to said other control module, wherein the control module is equipped with a transfer switch configured to automatically switch the communication mode of the control module between acting as a ship type control module and acting as a shore type control module.

7. The control module according to claim 6, wherein by activating the transfer switch for switching from a ship type control module to a shore type control module, the control module is arranged to automatically execute the following transfers:

for electrical umbilical lines, rewire predefined pins of the connectors from ship type to shore type;

for fiber-optic umbilical lines, set the communication frequencies for sending and receiving at applicable high band (receiving ship to shore communication) and low band (sending shore to ship communication) frequencies; and by activating the transfer switch for switching from a shore type control module to a ship type control module, the control module is arranged to automatically revert to the settings corresponding to those of a ship type control module.

* * * * *